(No Model.) 4 Sheets—Sheet 1.

V. H. ERNST.
ENGINE LATHE.

No. 325,662. Patented Sept. 8, 1885.

WITNESSES:

INVENTOR
Victor H. Ernst (No Model.) 4 Sheets—Sheet 2.
V. H. ERNST.
ENGINE LATHE.

No. 325,662. Patented Sept. 8, 1885.

WITNESSES:
Dom Twitchell
John ... Deemer

INVENTOR
Victor H. Ernst (No Model.) 4 Sheets—Sheet 3.
V. H. ERNST.
ENGINE LATHE.
No. 325,662. Patented Sept. 8, 1885.
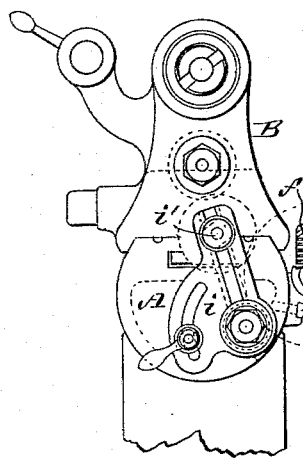
Fig. 3.
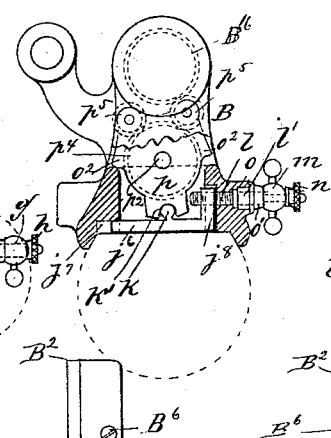
Fig. 4.
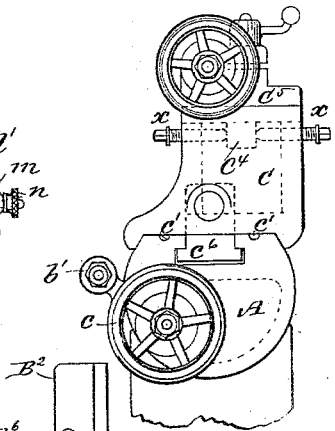
Fig. 5.
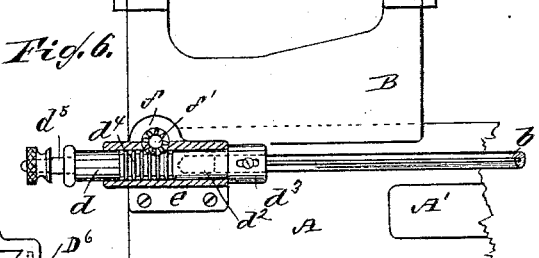
Fig. 6.
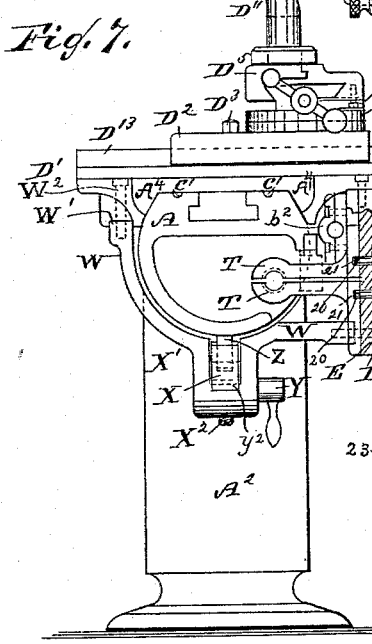
Fig. 7.
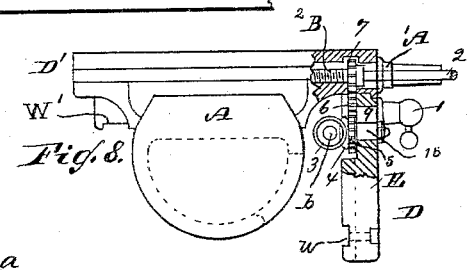
Fig. 8.
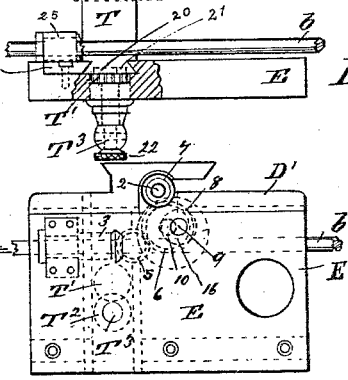
Fig. 10.
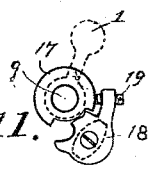
Fig. 9.
Fig. 11.
WITNESSES.
Dom Twitchell
John M. Deemer
INVENTOR
Victor H. Ernst
N. PETERS, Photo-Lithographer, Washington, D. C.

(No Model.) 4 Sheets—Sheet 4.
V. H. ERNST.
ENGINE LATHE.
No. 325,662. Patented Sept. 8, 1885.
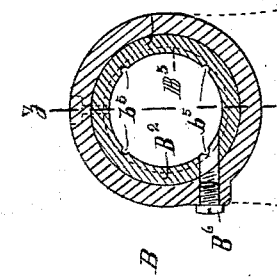
Fig. 14.
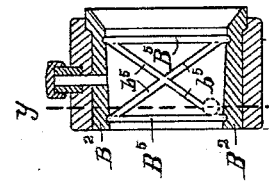
Fig. 15.
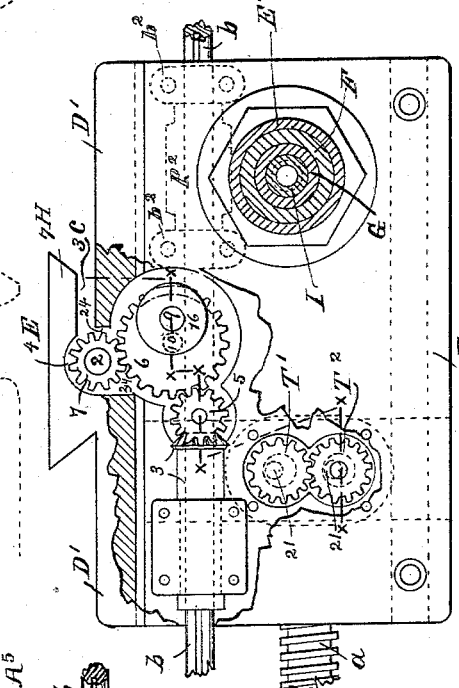
Fig. 13.
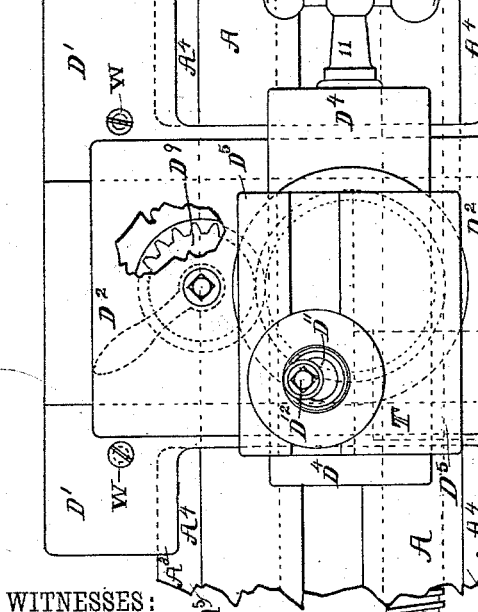
Fig. 12.
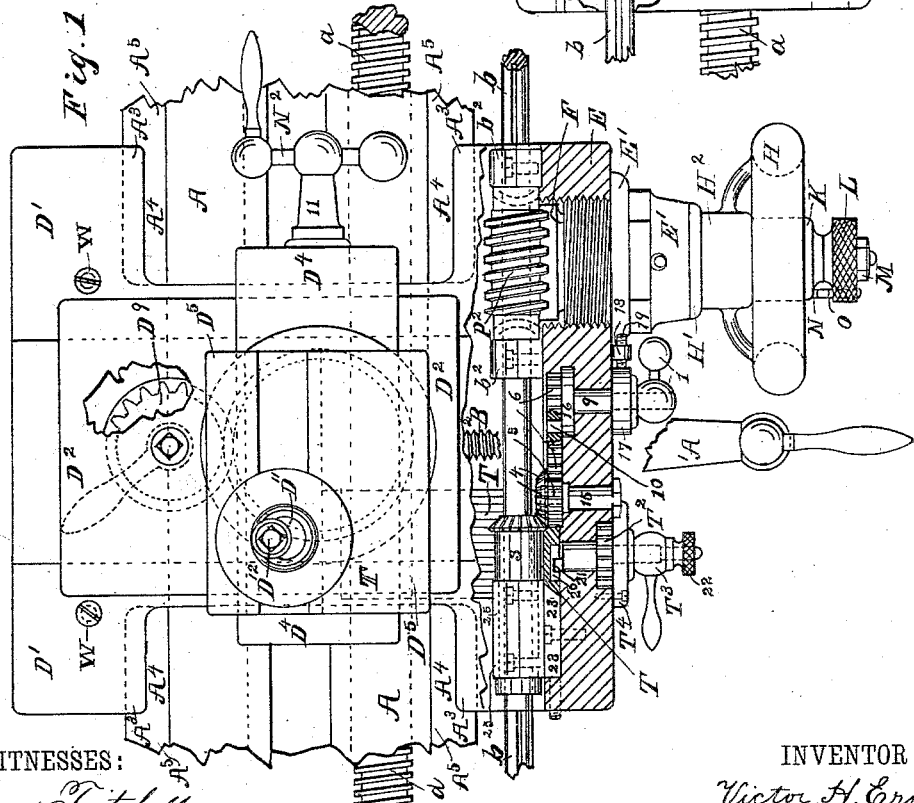
WITNESSES:
Donn Twitchell
John B. Deemer
INVENTOR
Victor H. Ernst

UNITED STATES PATENT OFFICE.

VICTOR H. ERNST, OF JERSEY CITY, NEW JERSEY.

ENGINE-LATHE.

SPECIFICATION forming part of Letters Patent No. 325,662, dated September 8, 1885.

Application filed February 20, 1885. (No model.)

*To all whom it may concern:*

Be it known that I, VICTOR H. ERNST, of Jersey City, in the county of Hudson and State of New Jersey, have invented a new and Improved Engine-Lathe, of which the following is a full, clear, and exact description.

Reference is to be had to the accompanying drawings, forming a part of this specification, in which similar letters of reference indicate corresponding parts in all the figures.

Figure 1:
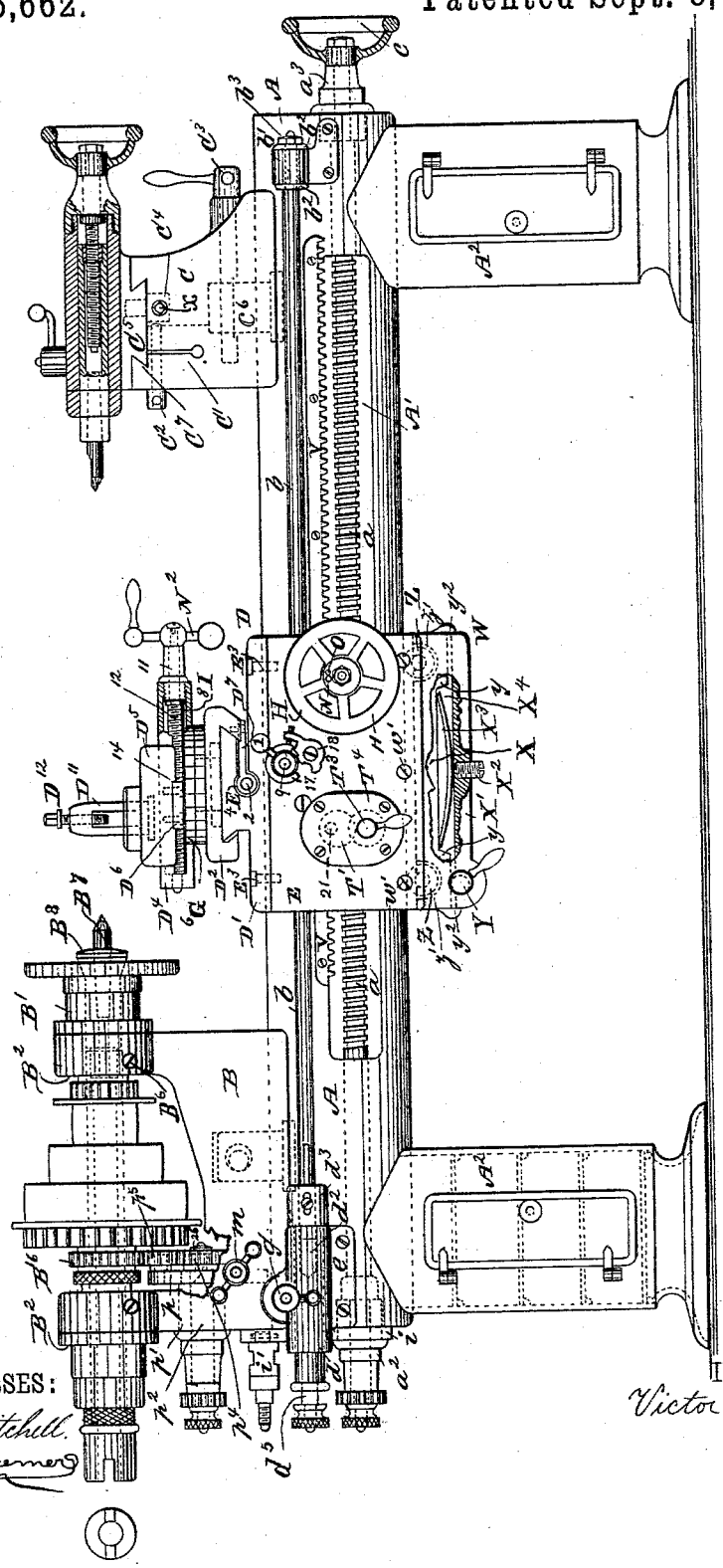
Figure 2:
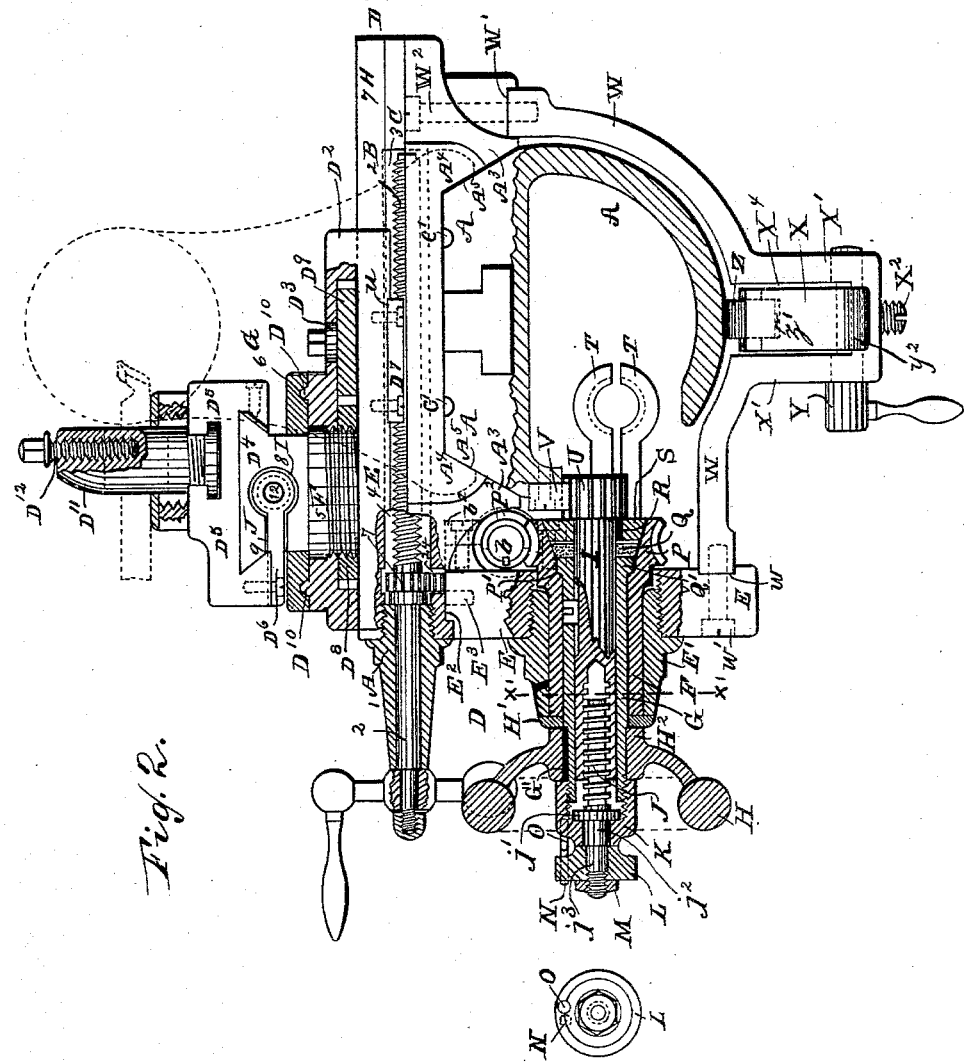

Figure 1, Sheet 1, is a front elevation, parts being broken away, of an engine-lathe embodying my improvements. Fig. 2, Sheet 2, is a sectional elevation of the carriage and yoke, showing the internal arrangement of the carriage-feed mechanism and devices for operating the swivel of the compound rest. Fig. 3, Sheet 3, is an end elevation, part being broken away, showing the devices for telescoping the feed-rod driving-sleeve on the feed-rod. Fig. 4 is an end elevation of the head-stock, part broken away, showing the devices for reversing the feed-rod and also the lead-screw. Fig. 5 is an end view of the offset foot-stock, showing also the hand-wheel for turning the lead-screw. Fig. 6 is a side elevation, partly sectional, showing the annular rack on the telescoping sleeve and the pinion and feed-rod. Fig. 7 is an end elevation, partly sectional, showing the devices for operating the two-part nut. Fig. 8 is an end view, partly sectional, of the carriage and the wheels and devices for operating the cross-feed. Fig. 9 is a plan view of the same, part being broken away. Fig. 10 is a front elevation of the carriage-apron, showing the independent cross-feed gearing and eccentric devices for throwing the cross-feed in and out of connection with the feed-rod and cross-feed screw. Fig. 11 is a front view of the adjustable stop for the cross-feed shifting mechanism to limit the mesh of the connecting gear-wheels. Fig. 12, Sheet 4, is a plan view of the compound rest, carriage-saddle, and lathe-bed, parts being broken out and others broken away, and also showing the carriage-apron on the irregular line $x$ $x$ $x$ $x$ $x$ $x$ of Fig. 13, exposing the arrangement of feed-rod-driving mechanism for and connection of the cross feed-screw. Fig. 13 is an enlarged front elevation, part broken out, showing the wheels and eccentric device and intermediate gear-wheel for connecting and disconnecting at one and the same time the intermediate gear-wheel from the cross-feed-screw gear-wheel and the feed-rod gear-wheels, showing, also, the carriage-rod feed-driving sleeves and shaft in section on the line $x'$ $x'$ of Fig. 2. Fig. 14 is a sectional end elevation of the head-stock bearing, showing the oil-distributing grooves and cleaning-aperture on the line $y$ $y$ of Fig. 15. Fig. 15, Sheet 4, is a sectional side elevation of the same, but showing the full length of the bearing, taken on the line $z$ $z$ of Fig. 14.

A is the bed; B, the head-stock; C, the foot-stock, and D the lathe-carriage.

The bed A is mounted upon pillars or pedestals $A^2$. The bed A is cast hollow, of semi-cylindrical form, with flat top, and arranged with a longitudinal opening extending along the front for introduction of the half-nut, in which to move and connect the lead-screw $a$. The ways are formed at the outer edges of the flat top, tapering downward and outward at an angle of about thirty degrees. On the top of the bed one or more longitudinal grooves, $c'$, are formed to break surface on either side of a central T-slot, which grooves may extend the entire length of the bed.

Upon the bed A is mounted the saddle D', arranged with overlapping ribs $A^3$, which take on the angling ways $A^5$ of the bed A. On each side of the saddle D' are formed recesses or pockets A to allow movement of the carriage a short distance past the rear end of the head-stock and the foot-stock to give the lathe-carriage a greater range. The apron E of the carriage D is secured to the saddle D' in a recess, $E^2$, by screws $E^3$. The front of the yoke W is secured to the apron E of the carriage D in a recess, $w$, by screws $w'$. The back of the yoke W is secured to the back of the saddle D' in a recess, W', by screws $W^2$. The yoke W is of rounded form, arranged to extend downward back of the bed A, lapping round but not touching it, curved inward across the bottom of the bed, and connecting with the apron D at $w$, leaving a space between the bed A and the yoke W at about the middle lower part of the yoke. In it is formed a downwardly-projecting rib, X', ranging longitudinally or parallel to the bed. In the rib X' a recess or pocket, X⁴, is formed, which may extend throughout the rib. In the recess or pocket thus formed a truck or frame, X, for steadying the carriage in its movements on the bed, is placed, arranged with rollers Z, mounted in suitable bearings in pockets Z'. The said truck or frame has overlapping lugs $y^2 y^2$, taking on the outer side edges of the rib X' of the yoke W, to retain the truck in place when moving the lathe-carriage.

On the truck or frame X shoulders $y y$ are provided, thereby forming a depression or recess. In this recess a bow-spring, X³, is passed; or a spring of other suitable form may be used. In a tappet-hole arranged about midway in bottom of rib X a screw, X², is screwed, which may be a thumb screw, whereby the pressure of the roller-truck on the bed A is increased or decreased, and the sensitiveness of the lathe-carriage is regulated. The roller-truck moves on a flat surface formed on the under side of the bed A.

In one end of the rib X' of the yoke W a cam-fastening, Y, is arranged, which takes on one end of truck X, beneath the truck, under or near one roller, Z. When using the cross-feed, or at other times, the carriage can be rigidly locked by turning the cam Y.

In the apron E of the carriage D is screwed the screw sleeve E' in a central orifice extending throughout the length of the screw-sleeve, in which is passed, to turn freely therein, the sleeve F, terminating at its inner end in a worm-wheel, P, which is adjacent to the inner face of the apron D. With the worm-wheel P meshes the worm-pinion P². The worm-pinion is mounted on the feed-rod $b$, between boxes $b^2$, and is arranged with a key to take in a spline in the feed-rod and to slide thereon.

In the face of the worm-wheel P is formed a circular central tapering orifice. Within the orifice is placed a friction-disk, S, of like tapering form. The said disk is mounted upon a shaft, I, and kept from turning by a key in a spline, R, but free to move a short distance on the shaft. The tapering orifice in the worm-wheel P is arranged to extend below and forms a space or cavity immediately beneath the friction-disk S, and in this space is placed a disk, Q, of felt or like absorbing material to take up oil which may work out from the bearings of the sleeves and shafts F G I, and to prevent oil from working into and between the friction-disk and its bearing. This effectually prevents the friction-disk from sticking and becoming gummed up. At the bottom of the tapering orifice in the worm-wheel P, starting immediately therefrom, is formed a rounded annular recess or shouldered pocket, P', ending in a reduced central orifice or hole which extends outward throughout the sleeve F, thereby forming a bearing. Into the said bearing is passed a sleeve, G, turning freely therein, and which sleeve extends through the sleeve F, and beyond the screw-sleeve E' a disk, H', is passed upon the sleeve G and turns against the face of the screw-sleeve E'. The sleeve G is reduced slightly in diameter, thereby forming a shoulder-bearing. Upon this bearing against the shoulder is tightly placed the hand-wheel H, the hub H² of which is in contact with the disk H', so that by turning the hand-wheel the carriage is moved. By this arrangement the frictional resistance is reduced between the screw-sleeve E' and the hub H² of the hand-wheel H. The hand-wheel is kept from turning on the sleeve G by a key and spline, G'.

Upon the threaded end of the sleeve G is secured a nut or screw-sleeve, K, to retain the hand-wheel H. The sleeve G at its inner end is formed with an enlarged head, Q', which takes in the pocket or recess P' to retain the sleeve in the sleeve F in proper operative position.

In a central orifice extending throughout the sleeve G is passed a shaft, I, arranged to have a sliding movement within the sleeve and kept from turning by a key or spline or other analogous device. Upon the inner end of the shaft I is formed or to it is attached a gear-wheel, U, engaging the rack V, and within the opposite end of the shaft I is formed a tapped hole, and into the tapped hole is screwed the screw J, having the shoulder-head $j'$, which shoulder-head bears against the inner face of the screw-sleeve K. In a suitable hole arranged in the sleeve K, in which is passed the bearing $j^2$ of screw J, near the outer end of the screw J, a shoulder-bearing, $j^3$, is formed. Upon the shoulder-bearing $j^3$ is rigidly mounted the thumb-piece or button L, adjustably held in place by a nut, M, screwed upon the threaded end of the screw J. In a hole arranged near the outer edge of the thumb-piece or button L is passed the stop or pin N, and in the screw sleeve K is rigidly passed in a suitable hole the stop or pin O. The stops or pins N and O project past each other and are arranged circumferentially in line with each other to limit the movement of the thumb-piece or button L in tightening and loosening the friction feed device herein described, and whereby the sliding movement of the shaft I with gear-wheel U is controlled. The friction device may be adjusted to tighten and hold more or less rigidly, as may be desired, by moving the thumb-piece or button L upon the bearing $j^3$ of the screw J. The friction-disk S is arranged to have a sliding movement on the shaft I, so that the disk S cannot drag or friction against the face of rack V.

The saddle D' is arranged with an enlarged opening or hole, 4 E, which extends within a short distance of the rear end of the saddle. (See Fig. 2.) In a thread tapped in the hole at the outer end is secured a sleeve, 1 A. In a suitable bearing formed in the sleeve is mounted the shaft 2 of the screw 2 B. In one edge of the dovetail rib 7 H of the saddle D' a transverse opening or groove, 3 C, is formed extending into and of same length as hole 4 E. The cavities 4 E and 3 C thus formed serve as a space for the nut D⁷ to travel in, and the upper part of the saddle acts as a cover to protect the screw 2 B from chips and other particles. The nut D⁷ is mounted on screw 2 B. The shank of nut D⁷ is secured in a recess, $u$, by screws arranged on one bottom edge of slide D².

The saddle D⁴ is provided with a circular base-plate, 6 G, arranged on its under side a short distance from the edge with an annular beveled groove or recess in which takes an annular projection, D¹⁰, of like form, arranged on the face of the raised circular hub of the slide D². The raised hub may be graduated into degrees to set the compound rest at any desired angle. The circular plate 6 G of the swivel-saddle D⁴ is arranged with a downwardly-projecting swivel-stud, 5 F, having a threaded end, which stud takes in a suitable bearing formed through the hub of and in slide D².

In a suitable cavity provided in the bottom of slide D², a nut gear-wheel, D⁸, is arranged to screw on the threaded end of swivel-stud 5 F. In a second cavity, formed in the under side of slide D², arranged to break through and to communicate with first-named wheel-cavity, a smaller wheel, D⁹, is arranged to turn freely, the teeth of which mesh into the teeth of nut gear-wheel D⁸. The gear-wheel D⁹ is provided with a bearing-stud, D³, projecting upward through the slide D². The projecting end of the stud is squared for a wrench or handle whereby the compound rest may be fastened or unfastened by operation of gear-wheel D⁹ and nut gear-wheel D⁸.

Mounted on the saddle D⁴ is the tool-post slide D⁵, arranged with the usual gib and T-slot. In the T-slot is mounted adjustably the tool-post D¹¹, arranged with an offset set-screw, D¹². To give the tool or cutter a hold nearer to point of strain on the cutting-edge, the tool-post is provided with a threaded sleeve, nut, and disk for raising and lowering the tool.

In the saddle D⁴ is formed a cavity, 8 I, connected with a longitudinal opening, 9 J. (See Figs. 1 and 2.) In a thread tapped in the outer end of cavity 8 I is screwed a sleeve, 11, and in a suitable bearing in the sleeve is mounted the shaft end of screw 12, and mounted on screw 12 is nut D⁶, the shank or leaf end of which is secured in a recess, 14, by screws in the under side edge of tool-post slide D⁵. Mounted on the outer end of screw 12 is a suitable crank-handle, N².

In the saddle D', adjoining the end of screw-sleeve 1 A a downwardly-opening recess, 24, is formed. In the recess is rigidly mounted, on shaft 2 of screw 2 B, a gear-wheel, 7, and in the apron E is secured the stud 15 by a nut or otherwise. The stud 15 has on its inner end an inwardly-projecting short shaft, and upon the shaft is mounted to turn freely the bevel-wheel 4 and gear-wheel 5, which bevel-wheel and gear-wheel are made in one piece and retained by a nut screwed on the stud, or the wheels may be made in two parts, secured together by screws or otherwise, so the wheels will turn as one wheel, or drive together.

In the apron E, in a suitable bearing, a short shaft or stud, 9, is mounted, and upon the inner end of stud 9 a disk, 16, is formed, or to it is attached. Upon the face, near one edge of disk 16, is formed or to it is attached an eccentric stud-bearing, 10, and upon the bearing is loosely mounted a gear-wheel, 6, retained in place by a nut, screw, or otherwise. Upon the projecting outer end of shaft 9 is arranged a handle or thumb piece, 1, whereby the eccentric device 9 10 16, and the wheel 6, are moved, and the gear-wheel 6 can be simultaneously thrown into gear with or disconnected from gear-wheel 5 and gear-wheel 7, leaving the intermediate gear-wheel, 6, without motion.

Stops 17 and 18 are arranged so the gearing 5 6 7 will not mesh too deep, and the wear can be allowed for by adjusting a screw, 19, arranged in the stop. The stop 17 is rigidly mounted on the short shaft or stud 9 on the front face of apron E of lathe-carriage D, and the adjustable stop 18 is secured on apron E by a screw, so it will have frictional contact to hold it in any position turned. A suitable spring can be used, if desired, to give additional friction.

The bevel-wheel 3 is mounted to slide on and turn with the feed-rod $b$, and is secured revolubly in a bracket bearing or box, 25, attached to the inner face of apron E of carriage D. The bevel-wheel 3 is arranged with a feather or key which takes in the spline or way in the feed-rod $b$, so the bevel-wheel 3 is turned by the revolutions of the feed-rod $b$.

The cross-feed mechanism, if desired, can be geared in a similar way as the lead-screw mechanism, to cut scrolls of any desired pitch, by arranging the wheels on feed-rod and stud to give the desired pitch, or when desired to use the carriage-feed in combination with the cross-feed to turn curved work of various radii, the two mechanisms can be operated simultaneously.

Each half of the lock-nut T T is constructed in L-form, with a dovetail foot or base on each half-section, and arranged to have an opening and closing movement in a dovetail vertical bearing formed in the apron E of carriage D. One side of the dovetail bearing is provided with a dovetail clamp-shoe, 23, and screws to take up wear. Each half of the nut T T on the dovetail foot-pieces is arranged with a transverse recess or slot, 20, in the face of the dovetail foot-piece.

Upon the outer face of the apron E are arranged two small gear-wheels, T' T², in a suitable cavity, the teeth of which mesh together. Each gear-wheel is provided with or to it is attached an inwardly-projecting short shaft, which shaft is mounted to have a free movement in a suitable bearing in apron E, and upon the end of the said shafts are formed or to them are attached eccentric studs 21, which project into the transverse recess 20 of the dovetail foot-piece of the L-shaped two-part nut T T.

One of the gear-wheels is formed with or to it is attached an outwardly-projecting short shaft or stud, upon which is mounted a thumb piece or handle, $T^3$, arranged with a spline and key to prevent the thumb-piece or handle from turning on the shaft, but free to have a slight sliding movement. Upon a thread formed on the outer end of the shaft is screwed a thumb-nut or button, 22. By tightening or loosening the thumb-nut 22 the nut T T can be opened or closed on the lead-screw $a$ by the thumb-piece or handle $T^3$, and rigidly held in locked or unlocked position.

Upon the outer face of apron E of carriage D is secured by screws a cap or cover, $T^4$, to retain the gear-wheels $T'$ and $T^2$, or the gear-wheels may be arranged on the inner side of apron E immediately beneath the dovetail L-formed pieces of the lock-nut. (See Fig. 9.)

The lathe-bed A is arranged with a tapped hole in each end, a short distance from the front and bottom edge and in line with each other. Into the tapped holes are screwed the sleeves $a^2$ and $a^3$, and in suitable bearings formed in the sleeves is mounted the lead-screw $a$. Thus arranged the lead-screw is covered and protected from chips and other particles. On the outer end of the lead-screw adjoining sleeve $a^3$, on a shoulder-bearing, is mounted the hand-wheel $c$, secured by a nut screwed on the threaded outer end of the lead-screw, whereby when the lead-screw is geared to a slow pitch, and the lathe cannot be run by power on account of the danger of breaking the gear-wheels and other parts, the lead-screw can be operated or turned by the hand-wheel $c$.

At one end, in front of the bed A at the top and near the base of head-stock, is secured by screws the bracket sleeve $e$.

In a suitable bearing formed in the bracket-sleeve $e$ is mounted to turn freely and to have a sliding movement the telescopic sleeve $d$. The sleeve $d$ has arranged on its inner end an enlarged shouldered head, $d^3$, having a hole extending about half the depth of the sleeve $d$.

Supported to slide in the hole or bearing is the feed-rod $b$. The rod $b$ extends into the hole about half its depth.

In the shoulder-head $d^3$ is arranged a key or feather which takes in the spline or way of the feed-rod $b$, so that in driving, the sleeve $d$ and feed-rod $b$ will drive as one. The sleeve $d$ is provided with the usual gear-wheel bearing, as $d^5$, and with a suitable thumb-nut.

The feed-rod $b$ is supported at its opposite end to turn freely in a bracket, $b'$, which bracket $b'$ is secured to the bed A by screws or bolts. The feed-rod $b$ is arranged with a shoulder-bearing in the bracket $b'$. Upon the shoulder-bearing are mounted disks $b^2$, one on each side of bracket $b'$, and upon the threaded outer end of feed-rod $b$ is screwed a nut, $b^3$, to retain the feed-rod and prevent lateral movement thereof.

About midway of the telescopic sleeve $d$ is formed an annular rack, $d^4$, with which engages a pinion, $f$, arranged in a counterbored cavity. The pinion is on the upper rear side of and opening into the bearing of bracket-sleeve $e$, and is covered thereby and turns freely therein. The pinion is provided with an outwardly-projecting shoulder-bearing stud or short shaft, $f'$, arranged to receive a handle or thumb-piece, $g$. The shaft $f'$ projects a short distance beyond handle $g$, and upon the projecting end a screw is formed, upon which thread is screwed a thumb-nut, $h$, whereby the pinion $f$ can be fastened in any position. The handle $g$ is provided with a key or feather (not shown) which takes in a spline in shaft $f'$ of pinion $f$, and which key prevents the handle $g$ from turning on shaft $f'$, but it is free to have a short sliding movement on the shaft to fasten the pinion $f$ in the counter-bored hole in the bracket-sleeve $e$ by nut $h$.

When it is desired to use a gear-wheel of large diameter on the lead-screw $a$, the sleeve $d$ can be telescoped on feed-rod $b$ by turning pinion $f$ with handle $g$, and locking or fastening the sleeve $d$ in the desired position by thumb-nut $h$. The usual adjustable intermediate connecting-yoke, as $i$, is provided, having a movable stud, as $i'$.

The head-stock B is fastened to the lathe-bed by a cam-bolt or other suitable device. The head-stock is constructed with hardened anti-friction bearings $B^2$, arranged with annular grooves $B^5$ near the inner and outer ends of the bearings. A right and a left spiral or reverse groove, $b^5$, connects with each annular groove $B^5$. A hole is arranged in the bearing-boss of front and back standard of head-stock B, to extend through one side of the boss in front and into the bearing $B^2$ near the bottom to meet the annular groove, preferably at the inner annular groove, $B^5$, of each bearing, whereby gritty or other particles which have been introduced by oil or otherwise can be removed or run out of the hole. The hole is tapped at its outer end, and a screw-plug or screw, $B^6$, is screwed in to close the opening. The spiral cross-grooves $b^5$ distribute the oil continuously and evenly over the spindle $B'$ and reduce liability of cutting, and the end grooves, $B^5$, tend to remove the grit or floating particles. The lathe-spindle $B'$ is made hollow and arranged for a spring-chuck system operated by a draw-in spindle or otherwise. The center $B^7$ is held in a blank chuck, $B^8$, and not driven into the lathe-spindle, thereby insuring truth of center and preventing harm to lathe-spindle incident to a center, which takes direct in the spindle and is driven therein; or the center and chuck may be formed in one piece.

In the rear standard of the head-stock, about midway of the height, is formed a tapped hole, into which is screwed a sleeve, $p'$, projecting a short distance beyond the inner face of the rear standard of the head-stock. On a shoulder formed on the inner projecting end is mounted to have a free movement a yoke, $p$. In a bearing formed in the sleeve $p'$ is mounted a short shaft, $p^2$. On the inner end of the shaft is formed a shoulder-bearing. Upon the shoulder-bearing is rigidly mounted a gear-wheel, $p^4$, having a short hub or collar which takes against or on the face of yoke $p$ to steady the yoke. On the threaded inner end of the shaft is screwed a nut, 26, to retain gear-wheel $p^4$ rigidly in place.

In the rear under side of the head-stock, near the end, and to register with the yoke $p$, is formed a transverse recess, $j^7$, in which recess is arranged to slide an ⌐-formed knuckle-joint bar, $j$, having an upwardly-projecting arm or lug, $j^8$, which arm has a tapped hole near its upper end, in which takes a shifting-screw, $l$. In an outwardly-projecting boss, $o$, of the head-stock B, is formed a tapped hole. A sleeve, $o'$, is screwed into the tapped hole. Mounted in a bearing in the sleeve $o'$ is the shaft $l'$ of screw $l$. A shoulder-bearing is formed on the projecting end of shaft $l'$ of screw $l$. Mounted thereon to have a sliding movement is a ball-lever or other handle, $m$, arranged with a spline and key, (not shown,) so the screw $l$ will be turned by handle $m$. On the outer end of shaft $l'$ is formed a screw, and thereon is screwed a thumb-nut or button, $n$.

Upon the upper edge of bar $j$ near its middle is formed a knuckle, $k$. In the downwardly-projecting arm of yoke $p$, in the rounded end thereof, is formed a rounded transverse recess or opening, $k'$, in which takes the knuckle $k$ of bar $j$.

Upon the upper outer rounded corners of the yoke $p$, a short distance from the edge, are mounted, on short shafts or studs, two gear-wheels, $p^5$, one on either side of yoke $p$, the teeth of which gear-wheels mesh with gear-wheel $B^{16}$.

When it is desired to change the travel of feed-rod or lead-screw from right to left or left to right, the screw $l$ is turned by handle $m$, causing the knuckle-joint bar $j\,k\,j^2$ to move the yoke, thereby throwing one or the other of gear-wheels $p^5$ in connection with gear-wheel $B^{16}$ whichever direction the feed-rod or lead-screw is desired to turn. A stop is provided on the yoke $p$ on either side at $o^2$ arranged to act on either side of head-stock on rear part of pulley-throat. The knuckle-joint bar may have a pop-spring catch or other stop for middle point when both gear-wheels $p^5$ are out of gear or at rest.

The foot-stock C is mounted on bed A, and has overlapping downwardly-tapering ribs which take on the bevel top side or ways of the lathe-bed. The foot-stock is constructed to offset to one side at the rear, so that in setting the compound rest to turn angles the handle or crank $N^2$ will have space to turn freely, and the operator can turn the crank without striking the foot-stock. The set-over of the foot-stock is arranged with a dovetail slide without gib to insure rigidity, and the foot-stock base is divided or split vertically from front to rear, and beneath the dovetail slide $C^5$, about half-way the height of foot-stock, to form a spring-clamping jaw, $C^7$. A clamping-screw, $C^2$, is arranged in the jaw $C^7$, the threaded end of which screw takes in the foot-stock frame. A lug or stop, $C^4$, is rigidly secured or screwed into the bottom of slide $C^5$, passed in from the under side of the foot-stock. Two set-screws, $x$, are arranged in the foot-stock at front and rear which take on stop-lug $C^4$.

When it is desired to set the center of foot-stock to one side, the clamping-screw $C^2$ is unfastened, the center slide, $C^5$, adjusted to the desired side by screws $x$. Then the binding-screw $C^2$ is tightened, thereby tightening the spring-clamp jaw $C^7$ against the side of dovetail slide $C^5$, rigidly securing the dovetail set-over thereby.

The foot-stock is secured to the lathe-bed by a cam-stud, $C^3$, and the bolt $C^6$, which bolt takes in a T-slot of the lathe-bed, and in the base of the foot-stock the cam-stud $C^6$ is arranged a short distance above the lathe-bed, with a permanent lever for operation thereof.

Having thus fully described my invention, I claim as new, and desire to secure by Letters Patent—

1. In an engine-lathe, the combination, with the lathe-carriage apron, of a revoluble sleeve carrying a worm-wheel, a friction device arranged in the worm-wheel, a headed sleeve mounted revolubly in the worm-wheel sleeve, a hand-wheel mounted on the headed sleeve, and a shaft having a gear-wheel, which shaft is mounted to slide in the headed sleeve, substantially as shown and described.

2. In an engine-lathe, the combination, with the carriage-apron, of a revoluble sleeve having a worm-wheel, a friction device arranged in the worm-wheel, a headed sleeve mounted revolubly in the worm-wheel sleeve, a crank or hand-wheel secured to the headed sleeve, a shaft mounted to slide in the headed sleeve and carrying a gear-wheel, and means for connecting the headed sleeve and sliding shaft, substantially as set forth.

3. In an engine-lathe, the combination, with the carriage-apron, of a revoluble sleeve having a worm-wheel, the sleeve G, wheel H, the disk S, the sliding shaft I, having a gear-wheel meshing with a rack, and devices for holding and means for limiting the movement of the sliding shaft, substantially as herein shown and described, whereby the friction-disk is kept from crowding against the rack, as set forth.

4. The combination, with the worm-wheel sleeve and worm-wheels, sleeve G, wheel H, and screw-sleeve K, friction-disk S, shaft I, and wheel U, of the disk Q of absorbent material, substantially as shown and described, whereby the oil will be absorbed and retained from working into and between the friction device, as set forth.

5. The combination of apron E, provided with sleeve E', the revoluble sleeve F, having worm-wheel P, the headed sleeve G, provided with disk H', the wheel H, screw-sleeve K, the sliding shaft I, having gear-wheel U, the screw J, shaft I, the button L, adjustably mounted on screw J, and devices, substantially as shown and described, for limiting the sliding movement of shaft I, and for adjusting and stopping the screw J, as set forth.

6. In combination with headed sleeve G, the disk H', hand-wheel H, screw-sleeve K, and the shaft I, having gear-wheel U, the screw J, the shaft I, the button L, adjustably mounted on screw J, and stop devices, as shown and described, on sleeve K, and button L, as set forth.

7. The disk Q of absorbent material mounted in a cavity in worm-wheel P surrounding shaft I, and covered by friction-disk S, substantially as shown and described, and for the purpose set forth.

8. The combination, with saddle D', having pockets A⁴, of the yoke W, connecting the saddle D' and the apron E, substantially as shown and described, and for the purpose set forth.

9. The combination of yoke W, having the rib X', and provided with a pocket or recess, in which is mounted a truck carrying rollers, a spring arranged to exert a pressure on the truck, and a device to adjust the tension of the spring on the truck, and the rollers, substantially as shown and described.

10. The combination of yoke W, having rib X' and recess X⁴, and the truck X, having rollers Z, arranged with a cam to take on the roller-truck, substantially as shown and described.

11. In an engine-lathe, the combination, with the saddle D' and the slide D², of the saddle D⁴, having swivel stem F⁵, the nut-gear wheel D⁸, and the gear-wheel D⁹, having a bearing-stem for operation, substantially as shown and described, and for the purpose set forth.

12. The compound rest-saddle D⁴, having the circular base 6 G, arranged with an annular beveled recess in the under side, in which takes the annular rib or track D¹⁰, formed on the face of the projecting hub of slide D², the threaded stem 5 F, and a nut gear-wheel arranged to take on the threaded stem, and devices for operating the gear-nut, all in combination, substantially as shown and described, and for the purpose set forth.

13. In an engine-lathe, the combination, with the apron E and the saddle D', of the feed-screw 2 B, having a gear-wheel, 7, the bevel-wheel 3, mounted on apron E, the connected bevel-wheel 4, and gear-wheel 5, mounted revolubly on stud 15, and an intermediate gear-wheel mounted on an eccentric bearing, and devices whereby the intermediate gear-wheel can be simultaneously thrown into gear with or out of gear from the gear-wheels 5 and 7, substantially as shown and described, and for the purpose set forth.

14. In an engine-lathe, the combination, with the carriage-apron, of the shaft 9, having the disk 16, provided with the eccentric bearing-stud 10, the gear-wheel 6, mounted on stud 10, the stop 17, and the adjustable stop 18 19, substantially as shown and described, and for the purpose set forth.

15. In an engine-lathe, the combination, with the carriage-apron, of an adjustable movable stop secured in frictional contact with the apron, a shifting stop rigidly mounted on a shaft, and a gear-wheel mounted revolubly on an eccentric formed on the shaft, substantially as shown and described, and for the purpose set forth.

16. In an engine-lathe, the combination, with the bed A, of the bracket-sleeve $e$, the sleeve $d$, mounted revolubly in the bracket-sleeve, and having the annular rack $d^4$ and an enlarged head, $d^3$, and the pinion $f$, having the shaft $f'$, handle $g$, and thumb-nut $h$, substantially as shown and described, and for the purpose set forth.

17. In an engine-lathe, the combination, with the bed A, of the telescopic-headed racked sleeve $d$, mounted revolubly on the bracket-screw, the feed-rod $b$, having one end mounted to slide and turn with the headed sleeve, and the pinion $f$, operating to telescope the headed screw $d$ on the feed-rod, substantially as shown and described, and for the purpose set forth.

18. In an engine-lathe, the combination, with the lathe-bed, of a bracket-sleeve, a headed sleeve having an annular rack mounted revolubly in the bracket-sleeve, and a pinion mounted in the bracket-sleeve to engage the annular rack, substantially as shown and described, whereby the headed sleeve can be moved forward or backward, as set forth.

19. In an engine-lathe, the combination, with the head-stock, of the bearing-bushings B², having annular grooves $b^5$, connected by spiral cross or reverse grooves B⁵, and provided with a cleaning-hole closed by a screw-plug, B⁶, to retain the oil, substantially as shown and described, and for the purpose set forth.

20. In an engine-lathe, the combination, with the head-stock, of a pivoted yoke, a knuckle-joint bar, a shifting-screw, and a thumb-nut mounted on the shifting-screw, substantially as shown and described, and for the purpose set forth.

21. In an engine-lathe, the saddle D', having the pockets A⁴, in combination with the head-stock B, and the foot-stock $c$, substantially as shown and described, and for the purpose set forth.

22. In an engine-lathe, the combination, with the head-stock having recess $j^6$, of the pivoted yoke $p$, having knuckle-recess $k'$, bar $j^8$, the shifting-screw $l$, provided with the lever-handle $m$, and thumb-nut $n$, substantially as shown and described, and for the purpose set forth.

23. In an engine-lathe, the offset foot-stock, provided with an adjustable dovetailed set-over slide, slotted transversely from its top to form a spring clamping-jaw to clamp the said dovetailed set-over slide, and a clamping-screw for operation, substantially as shown and described, and for the purpose set forth.

24. In an engine-lathe, the combination, with the foot-stock C, having a vertical slot, C', and the spring-clamping jaw C 7, of the adjustable set-over slide $C^5$, and the clamp-screw $C^2$, substantially as shown and described, whereby the set-over slide can be rigidly fastened, as set forth.

VICTOR H. ERNST.

Witnesses:
 EDGAR TATE,
 J. L. MCAULIFFE.